(12) United States Patent
Hoferer

(10) Patent No.: US 6,464,758 B1
(45) Date of Patent: Oct. 15, 2002

(54) APPARATUS AND METHOD FOR DEGASSING A LIQUID OR PASTY MEDIUM IN A MACHINE FOR PRODUCING AND/OR UPGRADING A FIBER MATERIAL WEB

(75) Inventor: Andreas Hoferer, Heidenheim (DE)

(73) Assignee: Voith Papertechnik Patent GmbH, Heidenheim (DE)

( * ) Notice: Subject to any disclaimer, the term of this patent is extended or adjusted under 35 U.S.C. 154(b) by 44 days.

(21) Appl. No.: 09/641,183

(22) Filed: Aug. 17, 2000

(30) Foreign Application Priority Data

Aug. 19, 1999 (DE) .......................... 199 39 275

(51) Int. Cl.[7] .............................................. B01D 19/00
(52) U.S. Cl. ............................. 95/261; 96/196; 96/214; 96/216; 210/188
(58) Field of Search .................. 95/261; 96/177, 96/196, 214, 216; 210/188

(56) References Cited

U.S. PATENT DOCUMENTS

| | | | |
|---|---|---|---|
| 2,549,968 A | * | 4/1951 | Hachmuth |
| 2,634,907 A | * | 4/1953 | Smith |
| 2,753,010 A | * | 7/1956 | Walther |
| 3,468,614 A | * | 9/1969 | Nilsson |
| 3,810,347 A | * | 5/1974 | Kartinen |
| 3,836,070 A | | 9/1974 | Trawinski ..................... 233/7 |
| 3,856,483 A | * | 12/1974 | Rumpf et al. |
| 3,973,930 A | | 8/1976 | Burgess ........................ 55/41 |
| 4,908,048 A | * | 3/1990 | Hofmann et al. |
| 4,936,990 A | | 6/1990 | Brunsell et al. ............ 210/331 |
| 5,080,792 A | | 1/1992 | McGovern et al. ...... 210/512.1 |
| 5,993,518 A | * | 11/1999 | Tateyama |

FOREIGN PATENT DOCUMENTS

| | | | |
|---|---|---|---|
| DE | 138508 | * 11/1979 | |
| DE | 37 15 157 A1 | 11/1988 | ......... B01D/19/00 |
| DE | 40 23 595 A1 | 1/1992 | ......... E21B/21/06 |
| EP | 1 321 007 | 6/1973 | ......... B04B/11/02 |
| EP | 0 326 231 A1 | 8/1989 | ......... B01D/19/00 |
| EP | 0 618 012 A1 | 3/1994 | ............ B03D/1/14 |
| GB | 1 482 547 | 8/1977 | |
| GB | 2 008 971 A | 6/1979 | |

OTHER PUBLICATIONS

"Eine Zentrifuge zum Abscheiden kleiner Gasblasen aus hochvisjosen Flüssigkeiten", A Centrifuge For Separating Small Gas Bubbles From High–Viscosity Liquids, Dipl.–Ing. Günter Schädel, (Faculty of Chemical Engineering of the Fridericana University Karlsruhe, 1979; University Library Karlsruhe 79 DA 30 C.

* cited by examiner

Primary Examiner—Duane S. Smith
(74) Attorney, Agent, or Firm—Taylor & Aust P.C.

(57) ABSTRACT

An apparatus for degassing a liquid or pasty medium in a machine for producing and/or upgrading a fiber material web includes a vessel rotatable about an axis of rotation, a medium-supply device for introducing the medium to be degassed into the vessel, a medium-discharge device for discharging a low-gas fraction of the medium out of the vessel and a gas-discharge device for discharging a gas-rich fraction of the medium out of the vessel. The gas-discharge device has an immersion-tube arrangement with at least one immersion tube, the inlet orifice of each being arranged so as to be at least adjacent to the axis of rotation of the vessel.

15 Claims, 1 Drawing Sheet

APPARATUS AND METHOD FOR DEGASSING A LIQUID OR PASTY MEDIUM IN A MACHINE FOR PRODUCING AND/OR UPGRADING A FIBER MATERIAL WEB

BACKGROUND OF THE INVENTION

1. Field of the Invention

The invention relates to an apparatus for degassing a liquid or pasty medium in a machine for producing and/or upgrading a material web, in particular a web made of paper or cardboard.

2. Description of the Related Art

Such a degassing apparatus typically includes a vessel rotable about an axis of rotation, a medium-supply device for introducing the medium to be degassed into the vessel, a medium-discharge device for discharging a lower-gas fraction of the medium out of the vessel, and a gas-discharge device for discharging a gas-rich fraction of the medium out of the vessel.

An apparatus of this type is known, for example, from the dissertation by Dipl.-Ing. Guinter Schadel entitled, "Eine Zentrifuge zum Abscheiden kleiner Gasblasen aus hochviskosen Flüssigkeiten" ["A centrifuge for separating small gas bubbles from high-viscosity liquids"] (Faculty of Chemical Engineering of the Fridericana University Karlsruhe, 1979; University Library Karlsruhe 79 DA 30 C). In this apparatus, which operates in the manner of a centrifuge, the medium to be degassed is supplied to the inner wall of a rotating vessel. In this case, however, the medium covers the inner wall only as a thin film. The result of this is that, for a predetermined degassing quality and a predetermined quantity of medium to be degassed per unit time, the known apparatus requires a disproportionately large amount of construction space. The apparatus proposed by Schädel has therefore not gained acceptance in practice.

Instead, cyclones have been used conventionally (see, for example, EP 0 618 012 A1 and U.S. Pat. No. 5,080,792) in the prior art for the degassing of liquid or pasty media. In cyclones of this type, the medium to be degassed is introduced eccentrically into a stationary vessel, so that a swirling movement of the medium is established in the interior of the vessel. The centrifugal force caused by this swirling movement ensures segregation of the medium and the gas by utilizing the density differences between the liquid or pasty medium and the gas included in it. A disadvantage of this, however, is that the force bringing about this segregation has to be generated by the kinetic energy of the inflowing medium, thus leading to a high pressure drop or pressure loss at the cyclone. In order to compensate for this pressure loss, therefore, correspondingly high-performance pumps have to be provided in order to convey the medium to be degassed.

SUMMARY OF THE INVENTION

The present invention therefore, relates to a degassing apparatus of the generic type, which, while requiring a small amount of construction space, is capable of degassing per unit time even large quantities of liquid or pasty medium to a degree sufficient for practice that yet gives rise, at most, to a pressure drop which does not exceed an acceptable amount.

The present invention sets forth, in one embodiment, a degassing apparatus in which the gas-discharge device includes an immersion-tube arrangement having one or more immersion tubes, the inlet orifice of each being arranged so as to be at least adjacent to the axis of rotation of the vessel. The use of such an immersion-tube arrangement for extracting the gas-rich fraction out of the rotating vessel makes it possible to discharge this gas-rich fraction in a controlled manner, irrespective of the operating conditions (rotational speed) and of the design parameters (wall height and wall inclination) of the rotating vessel.

The quantity of gas-rich fraction discharged per unit time can be influenced by the choice of the immersion-tube diameter and, if appropriate, by varying the suction capacity of a pump which can be connected to the immersion-tube arrangement. Furthermore, by use of the immersion-tube arrangement, a vacuum can be applied locally in order to assist in the segregation of the medium. Thus, the degassing quality can be improved by setting the operating parameters of the vessel and the extraction parameters on the immersion-tube arrangement in adaptation to the respective medium. It may be advantageous, at the same time, to arrange the immersion-tube arrangement at least in the vicinity of the axis of rotation of the vessel, so that an agitating action and an accompanying renewed intermixing of the gas-rich and low-gas fractions can be avoided.

In a development of the invention, the inlet orifice of the immersion-tube arrangement may be assigned a grid structure which extends preferably over a predetermined distance in the direction of the discharge of the gas-rich fraction. This affords the possibility of breaking the envelope of gas bubbles contained in the gas-rich fraction as early as when the latter passes through the grid structure.

Consequently, the separation of the medium and the gas is achieved more easily and/or more quickly.

So that the apparatus can be operated with as little loss of medium as possible, the gas-discharge device may lead the gas-rich fraction of the medium to a collecting vessel, out of which, in turn, the medium-supply device is fed.

An inlet orifice of the medium-discharge device may extend essentially over the entire circumference of the vessel. This is advantageous because a larger quantity of low-gas medium can thereby be discharged per unit time, as compared with a locally concentrated medium discharge.

Moreover, the medium-discharge device may have a plurality of guide vanes which are rotatable jointly with the vessel. By use of these guide vanes, the flow of the low-gas fraction leaving the vessel through the outlet orifice is influenced. The guide vanes bring about a reduction in the degree of turbulence in the flowing medium upon which they act. Preferably, after passing the guide vanes, the medium is in a laminar flow state. The tendency of the medium to form flow-induced bubbles can thereby be reduced by passing it over the guide vanes, which has a positive effect on the degassing result.

The rotating vessel may be designed in such a way that it widens, preferably conically, from an outlet orifice of the medium-supply device into the vessel toward an inlet orifice of the medium-discharge device out of the vessel. Since the centrifugal forces acting on the medium inside the rotating vessel increase linearly in the radial direction, the segregation action, particularly in the region of the outlet of the low-gas fraction out of the vessel, can be reinforced by incorporating such a widening of the vessel.

So that gravity-induced asymmetries of the forces inside the vessel which act on the medium can be avoided, the vessel may advantageously be arranged in such a way that its axis of rotation runs essentially vertically during operation. Furthermore, so that undesirable loads (i.e., unbalances) on the apparatus due to its operation can be reduced, it is advantageous for the axis of rotation of the vessel to run through the interior of the latter. An even greater reduction in the above-mentioned loads can be achieved by designing the vessel to be essentially rotationally symmetrical and the axis of rotational symmetry thereof to coincide essentially with its axis of rotation.

For a further improvement in the result of the degassing of the medium, the outlet orifice of the medium-supply device may be arranged at the lower end of the vessel when the latter is in operation, while the inlet orifice of the medium-discharge device may be arranged at the upper end thereof As a result, the dwell time of the medium in the vessel and, consequently, the degassing quality can also be increased, since, with this arrangement, the medium is delayed by gravity on its way from the medium-supply device to the medium-discharge device of the vessel.

A particularly good degassing result can be achieved with vessels which have a diameter of approximately 40 cm and are operated at a rotational speed of about 300–3000 revolutions per minute and preferably at a rotational speed of about 2000 revolutions per minute. While the degassing apparatus is in operation, the degree of filling of the vessel may amount to about 20%, so that effective operation of the plant, above all as regards the gas-discharge device, can be ensured.

According to a second embodiment, the invention includes a method for degassing a liquid or pasty medium in a machine for producing and/or upgrading a material web, in particular a web made of paper or cardboard. Specifically, the medium to be degassed is introduced into a vessel rotating about an axis of rotation, a low-gas fraction of the medium is discharged from the vessel and a gas-rich fraction of the medium is discharged from the vessel separately from said low-gas fraction, the vessel being operated with a degree of filling of up to about 20%.

Schädel expressly points out, in his dissertation, that, when a centrifuge is used, the medium to be degassed should be exposed to the centrifugal force field only as a thin film on the inner wall of the centrifuge vessel. The reason for given by Schadel for this is that, with an increase in the layer thickness of the medium, the centrifugally induced hydrostatic pressure prevailing in the medium also rises, particularly in the near-wall regions of the layer. This, allegedly, on the one hand, reduces the rate of ascent of the small gas bubbles and, on the other hand, leads to some of the gas being physically dissolved in the medium again.

It is to the inventor's credit that he has overcome this prejudice which has existed amongst specialists for 20 years. Assuming the same throughput quantity per unit time, an increase in the degree of filling of the centrifuge vessel leads to an increase in the dwell time of the medium in the vessel due to the buffer effect of the vessel volume. This has a beneficial effect on the degassing quality.

BRIEF DESCRIPTION OF THE DRAWINGS

The invention is explained in more detail below by means of an exemplary embodiment with reference to the accompany drawing in which.

Figure 1:
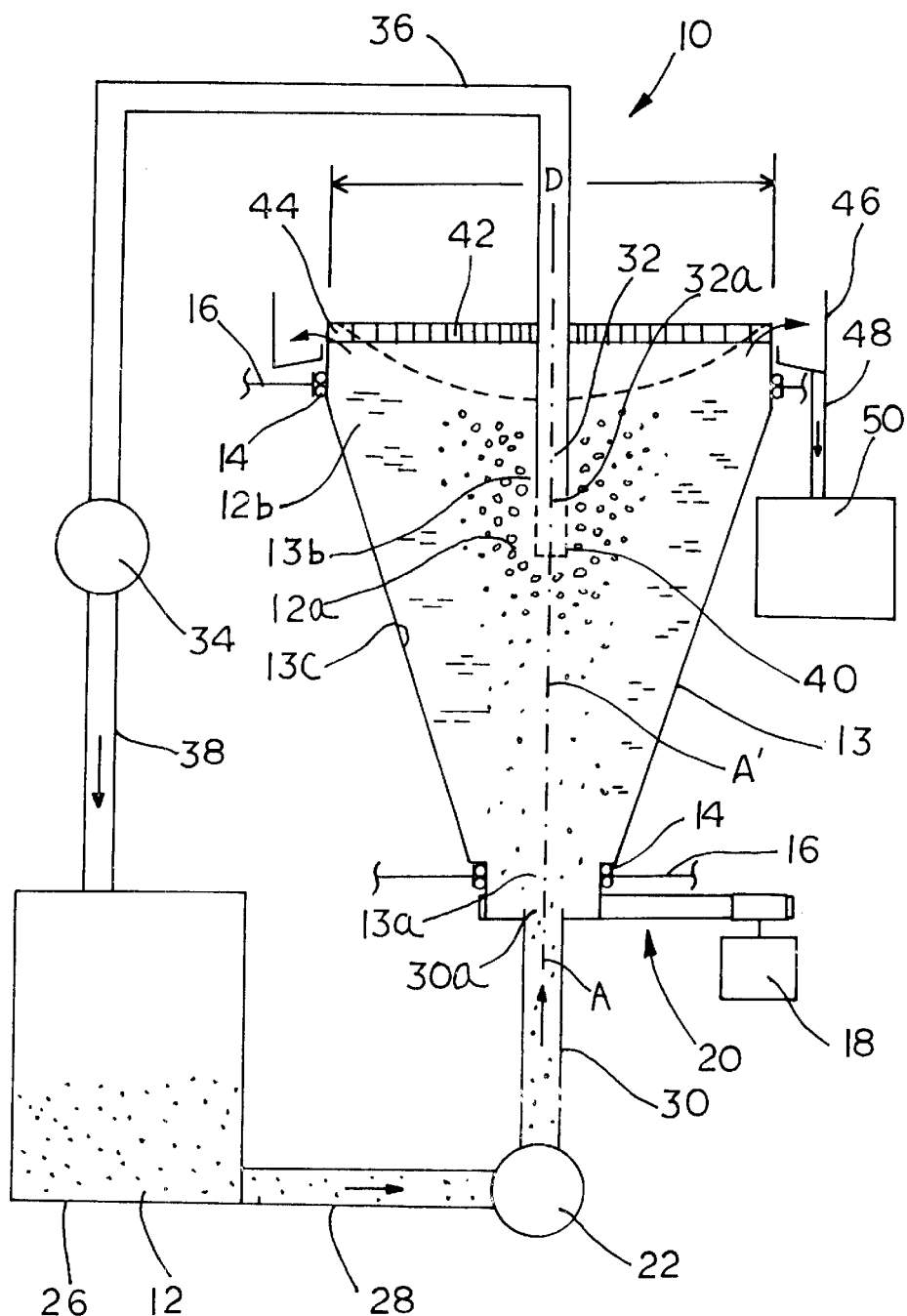
FIG. 1 is a roughly diagrammatic cross-sectional view of the apparatus according to the invention.

Corresponding reference characters indicate corresponding parts throughout the several views. The exemplification set out herein illustrates one preferred embodiment of the invention, in one form, and such an exemplification is not to be construed as limiting the scope of the invention in any manner.

DETAILED DESCRIPTION OF THE INVENTION

In FIG. 1, a degassing apparatus 10 for degassing a liquid or pasty medium 12 includes a vessel 13 which is fastened rotably in a stand or housing 16 via bearings 14. A motor 18 and a belt mechanism 20 serve as a rotary drive for vessel 13. Vessel 13 has a diameter D and is of rotationally symmetric design, its axis of symmetry A' coinciding with the essentially vertically-running axis of rotation A. A pump 22 conveys medium 12 to be degassed out of a reservoir 26 into vessel 13 via lines 28 and 30. Outlet orifice 30a of line 30 is arranged centrally at lower end 13a of vessel 13.

Under the action of the centrifugal force originating from the rotation of vessel 13, medium 12 to be degassed, which is supplied to vessel 13, is fractionated into a gas-rich fraction 12a and a low-gas fraction 12b. For discharging gas-rich fraction 12a, which accumulates in the vicinity of axis A, an immersion tube 32 is arranged at upper end 13b of vessel 13 coaxially about axis A. Immersion tube 32 is provided at its inlet orifice 32a with a grid structure 40 which, starting from inlet orifice 32a, extends a predetermined distance in the axial direction of immersion tube 32 into medium 12 located in vessel 13 and serves for breaking up the envelopes of the small gas bubbles. A pump 34 conveys gas-rich fraction 12a into reservoir 26 via immersion tube 32, adjoining line 36 and line 38.

Low-gas fraction 12b located in the vicinity of inner wall 13c of vessel 13 is discharged by centrifugal force from vessel 13 through an outlet orifice 42 extending at upper end 13b of vessel 13 over the entire circumference of the latter, the circumference being defined mathematically as the product D*pi. In order to reduce or fully compensate flow turbulences which are possibly caused in medium 12 on its way through vessel 13, guide vanes 44 corotating with vessel 13 are arranged in the region of medium outlet orifice 42. Guide vanes 44 are, in this case, set in such a way that the flow of low-gas fraction 12b, when it passes through outlet orifice 42, is steadied by guide vanes 44, thereby decreasing the degree of turbulence of the flow. The tendency for gas bubbles to be introduced once again into low-gas fraction 12b by flow turbulences is thus also reduced.

After passing through outlet orifice 42, low-gas fraction 12b enters a collecting device 46, from which it is discharged, for example, into a collecting vessel 50 via a line 48.

In order to increase the efficiency of the degassing operation, vessel 13 is designed in such a way that, starting from outlet orifice 30a of medium supply line 30, it widens conically toward outlet orifice 42 where low-gas fraction 12b is discharged.

As indicated in FIG. 1, vessel 13 is operated with a relatively high degree of filling of up to about 20%. The broken line in the region of upper end 13b of vessel 13 represents a section through a surface of a rotating liquid, the surface being formed parabolically in a known way. The high degree of filling of vessel 13 makes it possible to separate immersion tube 32 spatially from outlet orifice 30a of the medium supply line 30 and thereby to prevent a fluidic "short circuit". Furthermore, due to the high degree of filling, the dwell time of medium 12 in vessel 13 is increased, which has a beneficial effect on the result of the degassing operation.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A degassing apparatus for degassing a medium which is one of liquid and pasty in a machine for at least one of producing and upgrading a fiber material web, said apparatus comprising:

a vessel rotatable and essentially oriented about an essentially vertical axis of rotation, said vessel having a vessel interior, a vessel length, an upper vessel end and a lower vessel end;

a medium-supply device configued for introducing the medium into said vessel;

a medium-discharge device configured for discharging a low-gas fraction of the medium out of said vessel, said medium-discharge device having a medium outlet orifice through which the low-gas fraction of the medium is discharged, said medium-discharge device further having a plurality of guide vanes proximate said medium outlet orifice, said guide vanes being jointly rotatable with said vessel, each said guide vane being configured for string a flow of the low-gas fraction of the medium upon passage thereof through said medium outlet office; and a gas-discharge device configured for discharging a gas-rich fraction of the medium out of said vessel, said gas-discharge device having an immersion tube arrangement including at least one immersion tube, each said immersion tube having a tube inlet orifice arranged so as to be at least adjacent to said axis of rotation, each said immersion tube being mounted relative to said upper vessel end and extending from said upper vessel end only a portion of said vessel length into said vessel interior.

2. The degassing apparatus of claim 1, wherein the gas-rich fraction is discharged in a first direction, and at least one said tube inlet orifice has assigned thereto a grid structure, said grid structure extending over a predetermined distance in said first direction.

3. The degassing apparatus of claim 1, further comprising a collecting vessel fluidly coupled both with said gas-discharge device and said medium-supply device, said gas-discharge device being configured for directing the gas-rich fraction to a collecting vessel, said medium-supply device being configured to be fed from said collecting vessel.

4. The degassing apparatus of claim 1, wherein said medium-discharge device has a medium-discharge inlet orifice, said vessel having a circumference, said medium-discharge inlet orifice extending essentially over the entire circumference of said vessel.

5. A degassing apparatus for degassing a medium which is one of liquid and pasty in a machine for at least one of producing and upgrading a fiber material web, said apparatus comprising:

a vessel rotatable about an axis of rotation;

a medium-supply device configured for introducing the medium into said vessel;

a medium-discharge device configured for discharging a low-gas fraction of the medium out of said vessel, said medium-discharge device having a medium outlet orifice through which the low-gas fraction of the medium is discharged, said medium-discharge device further having a plurality of guide vanes proximate said medium outlet orifice, said guide vanes being jointly rotatable with said vessel, each said guide vane being configured for steadying a flow of the low-gas fraction of the medium upon passage thereof through said medium outlet orifice; and a gas-discharge device configured for discharging a gas-rich fraction of the medium out of said vessel, said gas-discharge device having an immersion tube arrangement including at least one immersion tube, each said immersion tube having a tube inlet orifice arranged so as to be at least adjacent to said axis of rotation.

6. The degassing apparatus of claim 1, wherein said medium-supply device has a medium-supply outlet orifice, said medium-discharge device has a medium-discharge inlet orifice, and said vessel is wider adjacent to said medium-discharge inlet orifice than adjacent to said medium-supply outlet orifice.

7. The degassing apparatus of claim 6, wherein said vessel is substantially conical in shape.

8. The degassing apparatus of claim 5, wherein said axis of rotation is essentially vertically arranged.

9. The degassing apparatus of claim 1, wherein said axis of rotation is located in the interior of said vessel.

10. The degassing apparatus of claim 1, wherein said vessel is essentially rotational symmetric, said vessel having an axis of rotational symmetry, said axis of rotational symmetry essentially coinciding with said axis of rotation.

11. The degassing apparatus of claim 1, wherein said medium-supply device has a medium-supply outlet orifice, said medium-discharge device has a medium-discharge inlet orifice, said medium-supply outlet orifice being arranged adjacent said lower vessel end and said medium-discharge inlet orifice being arranged adjacent said upper vessel end.

12. The degassing apparatus of claim 1, wherein said vessel has a diameter, said diameter being about 40 cm, and wherein said vessel is configured to rotate at a speed in an approximate range of 300 to 3000 revolutions per minute.

13. The degassing apparatus of claim 12, wherein said rotational speed is about 2000 revolutions per minute.

14. The degassing apparatus of claim 1, wherein said vessel has a volume, said vessel being configured to operate with up to 20% of said volume filled with the medium.

15. A degassing method for degassing a medium in a machine for at least one of producing and upgrading a fiber material web, the medium being one of liquid and pasty, said degassing method comprising the steps of:

providing a vessel having a volume, an interior, an upper end and a lower end;

introducing the medium into said vessel, filling up to about 20% of said volume thereof with the medium;

rotating said vessel about an axis of rotation, thereby separating the medium into a low-gas fraction and a gas-rich fraction, said axis of rotation being essentially vertical, said vessel being essentially oriented about said axis of rotation;

discharging said low-gas fraction out of said vessel;

providing at least one immersion tube extending from said upper end of said vessel and into said interior thereof; and discharging said gas-rich fraction out of said vessel separately from said low-gas fraction, said gas-rich fraction being discharged through at least one said immersion tube.

* * * * *

UNITED STATES PATENT AND TRADEMARK OFFICE
CERTIFICATE OF CORRECTION

PATENT NO. : 6,464,758 B1 Page 1 of 1
DATED : October 15, 2002
INVENTOR(S) : Andreas Hoferer It is certified that error appears in the above-identified patent and that said Letters Patent is hereby corrected as shown below:

<u>Column 5,</u>
Line 27, delete "string" and substitute -- steadying -- therefor.

Signed and Sealed this

Twenty-seventh Day of July, 2004

JON W. DUDAS
*Acting Director of the United States Patent and Trademark Office*